United States Patent [19]
Blackmer

[11] Patent Number: 6,006,460
[45] Date of Patent: Dec. 28, 1999

[54] GAME TAGGING SYSTEM AND METHOD OF USE THEREOF

[76] Inventor: Larry Alan Blackmer, 1000 Blue Star Hwy., South Haven, Mich. 49090

[21] Appl. No.: 08/938,424

[22] Filed: Sep. 26, 1997

[51] Int. Cl.⁶ ....................................................... G09F 3/00
[52] U.S. Cl. ................................. 40/300; 40/304; 40/665; 292/307 A
[58] Field of Search ................................ 40/299.01, 300, 40/304, 673, 674, 654.01, 638, 664, 665; 292/307 A, 322

[56] References Cited

U.S. PATENT DOCUMENTS

| | | | |
|---|---|---|---|
| 2,094,210 | 9/1937 | Graben | 40/665 |
| 2,203,155 | 6/1940 | Jullien et al. | 40/665 |
| 4,869,007 | 9/1989 | Fast | 40/664 |
| 5,225,162 | 7/1993 | Scoville | 40/674 |
| 5,279,057 | 1/1994 | Melin et al. | 40/633 |

FOREIGN PATENT DOCUMENTS

| | | | |
|---|---|---|---|
| 2045718 | 11/1980 | United Kingdom | 40/638 |

*Primary Examiner*—Brian K. Green
*Attorney, Agent, or Firm*—Flynn, Thiel, Boutell & Tanis, P.C.

[57] ABSTRACT

A game tagging system and method of affixing the game tagging system to a game animal utilizes a hunting license and a strip of material which displays the hunting license and attaches the hunting license to the game animal. The strip of material has an upper portion and a lower portion. The hunting license is attached to the lower portion of the strip of material and the upper portion of the strip of material is attached to the game animal. The game tagging system conveniently holds the hunting license until it is necessary to apply the license to the game animal and enables the hunter to easily and securely affix the hunting license to the game animal.

7 Claims, 2 Drawing Sheets

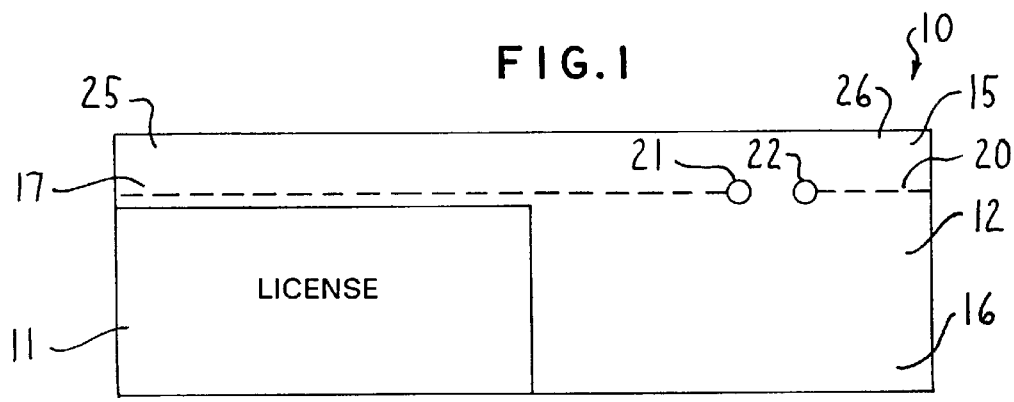
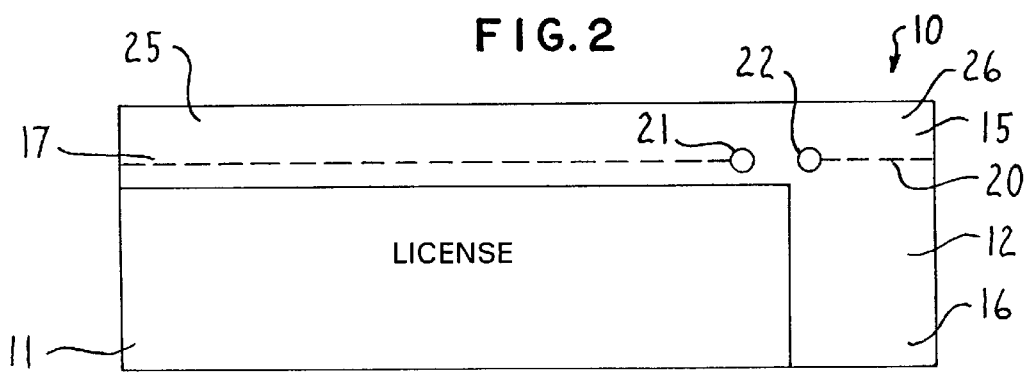
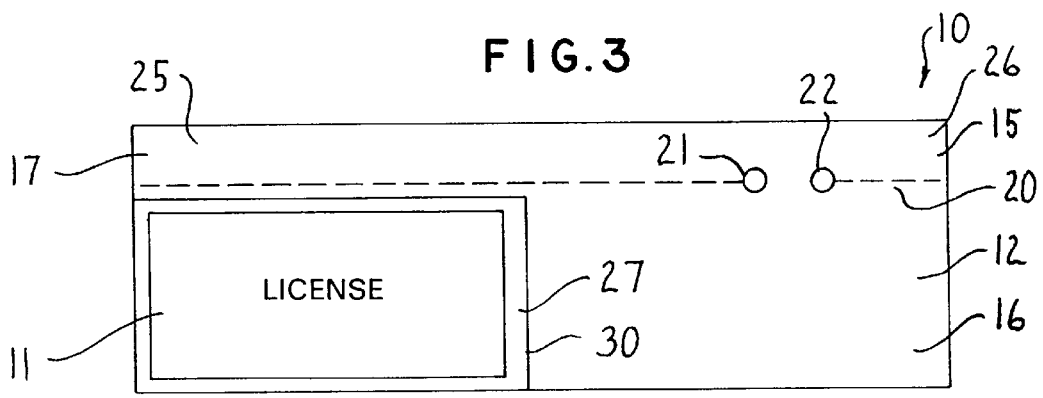
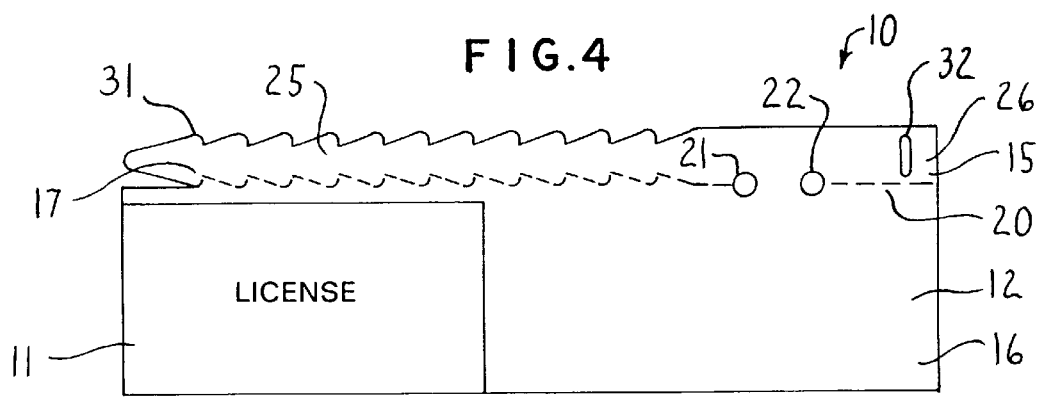

GAME TAGGING SYSTEM AND METHOD OF USE THEREOF

FIELD OF THE INVENTION

The present invention is directed to a game tagging system used to attach a hunting license to a game animal and a method utilizing the inventive game tagging system. The inventive game tagging system conveniently stores the hunting license until the license is applied to the game animal and enables the hunting license to easily and securely be applied to the game animal.

BACKGROUND OF THE INVENTION

In order to hunt game animals in most jurisdictions, a hunter has to receive a license from a regulating agency in the jurisdiction which is to be attached to the harvested game animal. At the present time, once the hunter receives the issued license, there is no convenient way to store it until it is applied to the harvested animal. As such, many hunting licenses are lost before they can be used.

An additional problem associated with hunting licenses is that the hunter has to affix the license to the harvested animal in the field and there is no easy way to do this. The hunting license can be attached to the game animal by strings or rubber bands but these articles are cumbersome to carry out in the hunting arena and can easily become disengaged from the animal during its transport and result in the license being lost.

Therefore, there is a need to provide a game tagging system which conveniently stores a hunting license until it is desired to apply it to a game animal and allows the license to be securely attached to the harvested game animal. The present invention was arrived at in order to address these problems.

SUMMARY OF THE INVENTION

It is an object of the present invention to provide a game tagging system which provides an easy and efficient manner of storing a hunting license and affixing the hunting license to a game animal in the hunting arena.

This object is met by providing a game tagging system which comprises a hunting license, a strip of material and means for affixing the hunting license to the strip of material. The strip of material has a lower portion to which the hunting license is affixed and an upper portion comprising means for attaching the hunting license to the game animal.

BRIEF DESCRIPTION OF THE DRAWINGS

FIG. 1 is an illustration of a first embodiment of the present invention wherein the license contains an adhesive and is adhered to a front lower portion of the strip of material.

FIG. 2 is an illustration of a second embodiment of the present invention wherein the strip of material contains an adhesive and the license is adhered to a lower portion thereof.

FIG. 3 is an illustration of a third embodiment of the present invention wherein the strip of material is provided with a pocket and the license is contained therein.

FIG. 4 is an illustration of the first embodiment of the present invention having male and female fastening members.

DETAILED DESCRIPTION

Figure 5:
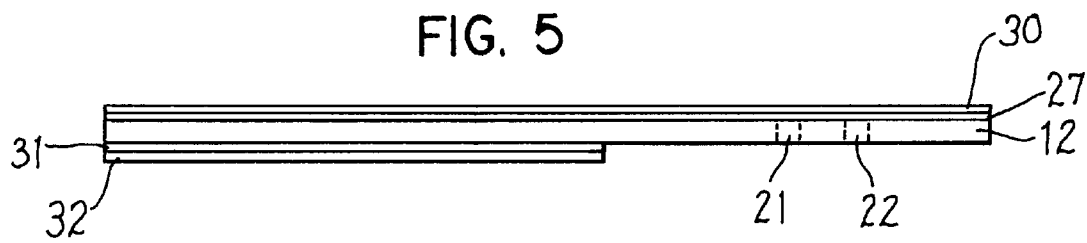
FIG. 5 is a top view of the second embodiment of the present invention.

FIG. 1 illustrates a first embodiment of a game tagging system 10 of the present invention. The game tagging system 10 is made up of a license 11 and a strip of material 12. The strip of material 12 has an upper portion 15 and a lower portion 16 which are separated from each other by a first cutline 17 and a second cutline 20 which extend toward each other and respectively terminate at a first hinge member 21 and a second hinge member 22. By tearing or cutting along the first cutline 17 and the second cutline 20, the upper portion 15 of the strip of material pivotably separates from the lower portion 16 of the strip of material about hinge portions 21 and 22 to form first and second fastening members. A layer of an adhesive material 27 is provided on the upper portion 15 of the strip of material along its back surface and a peelable backing layer 30 is provided on the adhesive layer.

In the first embodiment of the game tagging system 10 of the present invention illustrated in FIG. 1, the hunting license 11 has an adhesive layer (not shown) provided on a back surface thereof and is adhered to the strip of material 12 at its lower portion 16 by the adhesive layer. When it is desired to affix the game tagging system 10 to a game animal, the backing layer is peeled off of the first fastening member 25 and the second fastening member 26 to expose the adhesive layer provided thereon and the adhesive layers on the first and second fastening members 25, 26 are brought into contact with each other around a body part of the game animal, such as an antler or a leg, so that the game tagging system 10 is securely attached thereto.

In the second embodiment of the game tagging system 10 of the present invention, the hunting license 11 does not have an adhesive layer provided on a back surface thereof. Instead, second adhesive 31 and backing layers 32 are provided on the lower portion 16 of the strip of material 12 and when it is desired to adhere the license 11 to the strip of material 12, the second backing layer is peeled off the second adhesive layer and the license adhered thereto.

In a third embodiment of the game tagging system 10 of the present invention, a pocket member 27 is provided on a front surface of the lower portion 16 of the strip of material 12. The pocket member 27 is formed by adhering a rectangular layer 30 of a transparent material at three sides thereof to the lower portion 16 of the strip of material 12. The transparent layer 30 can be made of any suitable material, such as a transparent polymeric material, and can be adhered to the strip of material 12 by any suitable means such as heat sealing or through an adhesive. The license 11 is inserted into the pocket 27 through the open side thereof.

FIG. 4 illustrates a game tagging system 10 according to the first embodiment of the present invention, wherein the first fastening member 25 comprises a male fastening part 31 and the second fastening member 26 comprises a female fastening part 32. When it is desired to apply the game tagging system 10 to a body part of the game animal, the first fastening member 25 and the second fastening member 26 are pivotably separated from the lower portion 16 of the strip of material by cutting or tearing along the first and second cutlines 17, 20 and the male fastening part 31 is inserted through the female fastening part 32 at an appropriate length to securely attach the game tagging system 10 to the body part of the game animal.

The strip of material 12 can be made of any flexible material such as paper, foil or a thermoplastic material and preferably is a bright color, such as orange, which can be easily spotted in the field. Once the license 11 has been purchased, it can be attached to the strip of material 12 and conveniently carried about in the hunter's wallet or pocket until the time of use, thereby providing an easy manner of storing the hunting license.

Although particular embodiments of the present invention have been described by way of example, the present invention is not limited thereto and equivalents of the features of the present invention could readily be determined by one of ordinary skill in the art and not depart from the scope and spirit of the present invention.

The embodiments of the invention in which an exclusive property or privilege is claimed are defined as follows:

1. A game tagging system for affixing a hunting license to a game animal, said game tagging system comprising a strip of material having a parallelogram configuration with substantially parallel top and bottom edge surfaces and means for securing the hunting license to the strip of material, said strip of material having an upper portion, a lower portion, a front side and a back side, said upper portion of said strip of material being separated from said lower portion by first and second cutlines provided in and extending along the length of said strip of material towards each other, said first and second cutlines respectively terminating at first and second hinge members provided in said strip of material and forming first and second fastening members in said upper portion of said strip of material when said cutlines are cut along their length towards said hinge members, said first and second fastening members having top edge surfaces which form the top edge surface of said strip of material, and means for securing said first and second fastening members to each other by direct engagement, said means for securing the hunting license being provided on the strip of material at a lower portion thereof.

2. The game tagging system of claim 1, wherein said means for securing the hunting license to the strip of material comprises an adhesive and the means for securing the hunting license is provided at the front side of the lower portion of the strip of material.

3. The game tagging system of claim 1, wherein said means for securing the hunting license to the strip of material comprises an adhesive and is provided at the back side of the lower portion of the strip of material.

4. The game tagging system of claim 1, comprising an adhesive layer provided on the back side of the upper portion of the strip of material and a backing layer adhered to the adhesive layer.

5. The game tagging system of claim 4, wherein the adhesive layer is provided on the back sides of the first and second fastening members and comprises said means for securing said first and second fastening members to each other.

6. The game tagging system of claim 1, wherein the means for securing the hunting license to the strip of material comprises a pocket for containing the hunting license.

7. The game tagging system of claim 1, wherein said strip of material is selected from a member from the group consisting of a thermoplastic material, a cellulosic material and a metal foil.

* * * * *